United States Patent
Chin et al.

(10) Patent No.: US 8,958,324 B2
(45) Date of Patent: Feb. 17, 2015

(54) METHODS AND APPARATUS TO RESOLVE PAGING MONITORING CONFLICTS IN TD-SCDMA MULTIMODE TERMINAL WITH MIMO

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/505,886

(22) PCT Filed: Apr. 7, 2010

(86) PCT No.: PCT/US2010/030150
§ 371 (c)(1),
(2), (4) Date: Jul. 17, 2012

(87) PCT Pub. No.: WO2011/056253
PCT Pub. Date: May 12, 2011

(65) Prior Publication Data
US 2012/0275448 A1    Nov. 1, 2012

Related U.S. Application Data

(60) Provisional application No. 61/258,509, filed on Nov. 5, 2009.

(51) Int. Cl.
| | |
|---|---|
| *H04L 12/26* | (2006.01) |
| *H04L 12/28* | (2006.01) |
| *H04W 68/02* | (2009.01) |
| *H04B 7/04* | (2006.01) |
| *H04W 88/06* | (2009.01) |

(52) U.S. Cl.
CPC ............ *H04W 68/02* (2013.01); *H04B 7/0413* (2013.01); *H04W 88/06* (2013.01)
USPC ......... 370/252; 370/254; 370/389; 370/395.4

(58) Field of Classification Search
None
See application file for complete search history.

(56) References Cited

U.S. PATENT DOCUMENTS

| | | | |
|---|---|---|---|
| 2006/0128350 A1 | 6/2006 | Hurwitz et al. | |
| 2009/0124224 A1* | 5/2009 | Hildebrand et al. | 455/150.1 |

(Continued)

FOREIGN PATENT DOCUMENTS

| | | |
|---|---|---|
| CN | 1889411 A | 1/2007 |
| EP | 1626600 | 2/2006 |

OTHER PUBLICATIONS

International Search Report and Written Opinion—PCT/US2010/030150—ISA/EPO—Jul. 26, 2010.

(Continued)

*Primary Examiner* — Ashley Shivers
(74) *Attorney, Agent, or Firm* — Kristine U. Ekwueme

(57) ABSTRACT

Certain aspects of the present disclosure propose techniques for resolving paging interval conflicts between two different radio access technology (RAT) paging intervals and for avoiding missing paging messages for a multimode terminal (MMT). Certain aspects provide a method for detecting messages associated with paging, by an MMT supporting multiple-input multiple-output (MIMO), from first and second networks using first and second RATs, such as Time Division Synchronous Code Division Multiple Access (TD-SCDMA) and Code Division Multiple Access (CDMA) 1xRTT (Radio Transmission Technology), Evolution-Data Optimized (EVDO), or Wideband CDMA (WCDMA). The method generally includes using a first MIMO receive chain of the MMT to detect a first message associated with paging from the first network and simultaneously using a second MIMO receive chain of the MMT, different from the first receive chain, to detect a second message associated with paging from the second network.

20 Claims, 8 Drawing Sheets

(56) References Cited

U.S. PATENT DOCUMENTS

| | | |
|---|---|---|
| 2009/0215472 A1 | 8/2009 | Hsu |
| 2010/0003936 A1* | 1/2010 | Behzad et al. ............... 455/132 |
| 2012/0157140 A1* | 6/2012 | Kim et al. .................... 455/501 |
| 2012/0257553 A1* | 10/2012 | Noh et al. ................... 370/280 |

OTHER PUBLICATIONS

Taiwan Search Report—TW099111130—TIPO—Feb. 9, 2014.

* cited by examiner

METHODS AND APPARATUS TO RESOLVE PAGING MONITORING CONFLICTS IN TD-SCDMA MULTIMODE TERMINAL WITH MIMO

CROSS-REFERENCE TO RELATED APPLICATION(S)

This application claims the benefit of U.S. Provisional Patent Application No. 61/258,509, entitled "METHODS AND APPARATUS TO RESOLVE PAGING MONITORING CONFLICTS IN TD-SCDMA MULTIMODE TERMINAL WITH MIMO," filed on Nov. 5, 2009, which is expressly incorporated by reference herein in its entirety.

BACKGROUND

1. Field

Certain aspects of the present disclosure generally relate to wireless communications and, more particularly, to resolving paging interval conflicts between two networks communicating via two different radio access technologies (RATs).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

In an aspect of the disclosure, a method for detecting messages associated with paging, by a multimode terminal (MMT) supporting multiple-input multiple-output (MIMO), from first and second networks using first and second radio access technologies (RATs). The method generally includes using a first MIMO receive chain of the MMT to detect a first message associated with paging from the first network and simultaneously using a second MIMO receive chain of the MMT, different from the first MIMO receive chain, to detect a second message associated with paging from the second network.

In an aspect of the disclosure, an apparatus for detecting messages associated with paging from first and second networks using first and second RATs is provided. The apparatus generally includes means for using a first MIMO receive chain of the apparatus to detect a first message associated with paging from the first network and means for simultaneously using a second MIMO receive chain of the apparatus, different from the first MIMO receive chain, to detect a second message associated with paging from the second network.

In an aspect of the disclosure, an apparatus for detecting messages associated with paging from first and second networks using first and second RATs is provided. The apparatus generally includes at least one processor and a memory coupled to the at least one processor. The at least one processor is typically configured to use a first MIMO receive chain of the apparatus to detect a first message associated with paging from the first network and simultaneously use a second MIMO receive chain of the apparatus, different from the first MIMO receive chain, to detect a second message associated with paging from the second network.

In an aspect of the disclosure, a computer-program product for detecting messages associated with paging from first and second networks using first and second RATs is provided. The computer-program product typically includes a computer-readable medium having code for using a first MIMO receive chain of an MMT to detect a first message associated with paging from the first network and simultaneously using a second MIMO receive chain of the MMT, different from the first MIMO receive chain, to detect a second message associated with paging from the second network.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
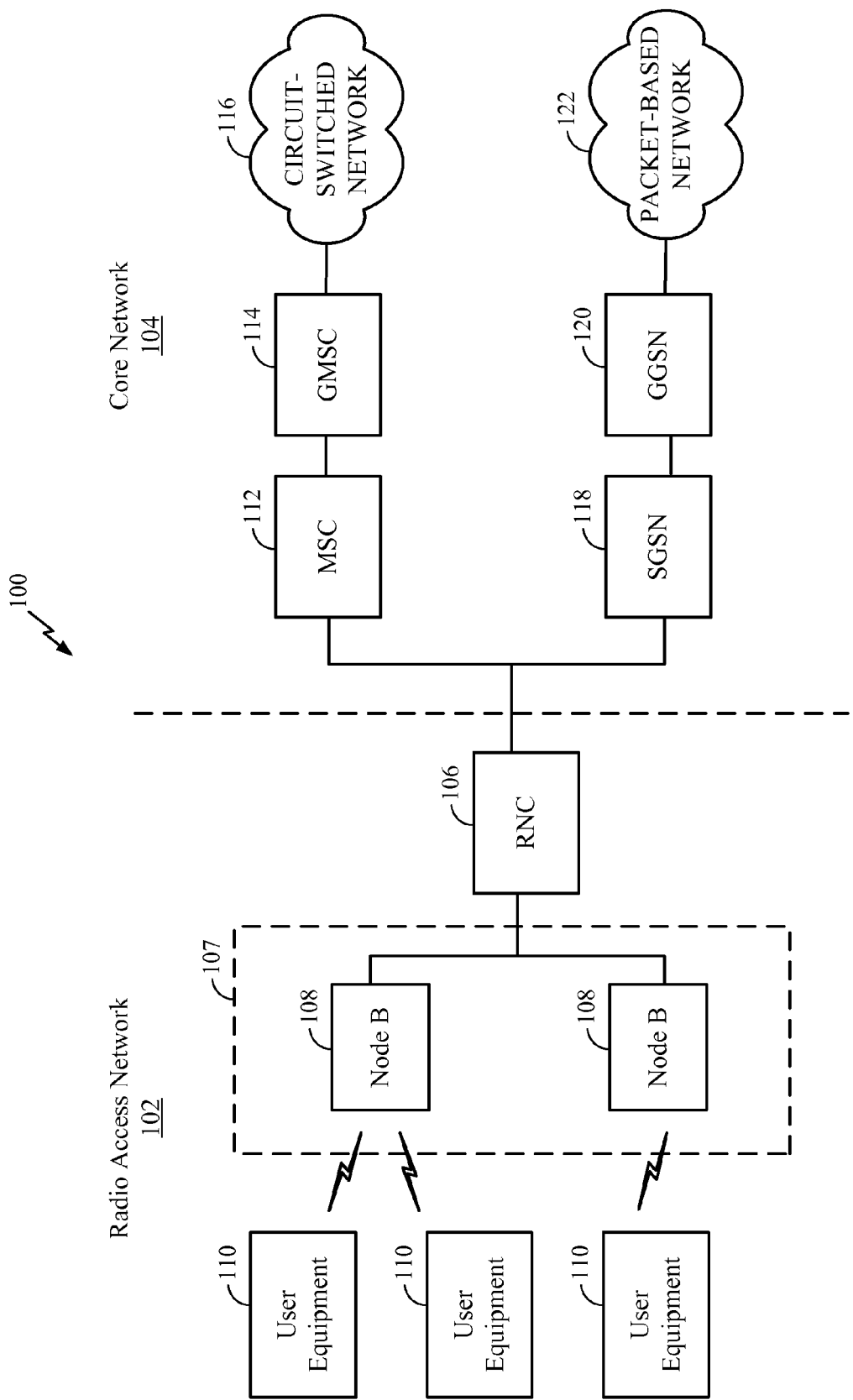
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
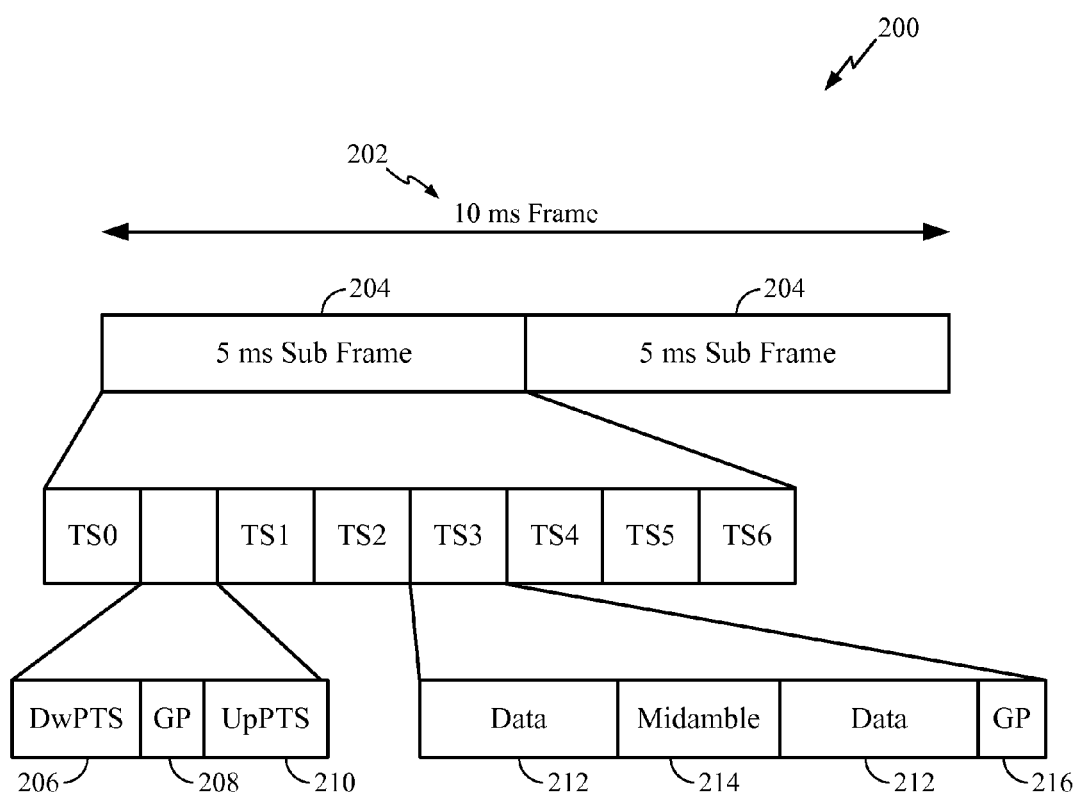
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
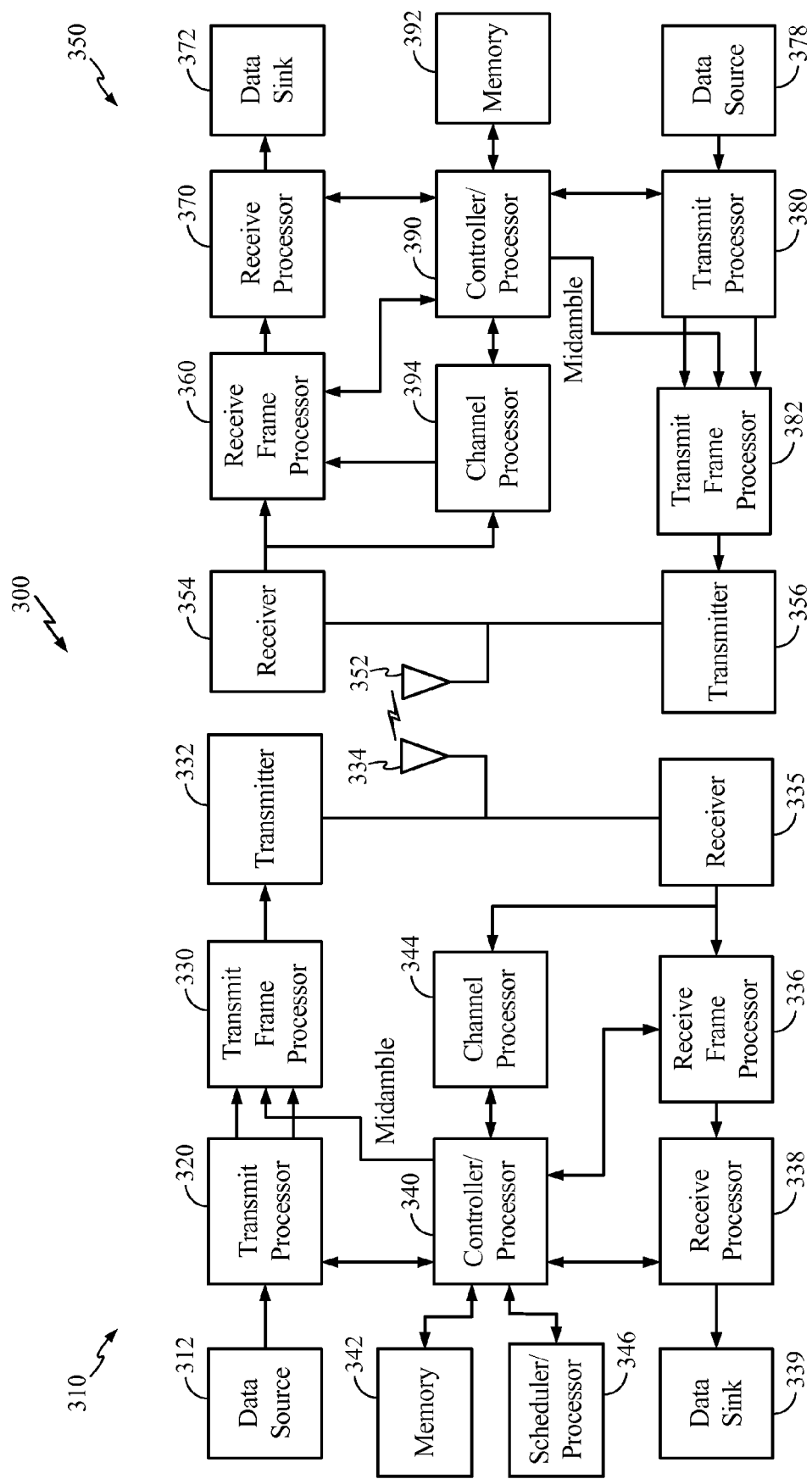
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

An Example Method to Resolve Paging Monitoring Conflicts in TD-SCDMA Multimode Terminal with MIMO In order to expand the services available to subscribers, some UEs support communications with multiple radio access technologies (RATs). For example, a multimode terminal (MMT) may support TD-SCDMA and CDMA 1xRTT (Radio Transmission Technology) for voice and broadband data services.

As a result of supporting multiple RATs, there may be instances in which an MMT may be in an idle mode in both the TD-SCDMA and the CDMA 1xRTT networks. This may require the MMT to listen for traffic indication or paging messages in both networks. Unfortunately, an MMT with a single RF chain may only listen to one network at a time.

Figure 4:
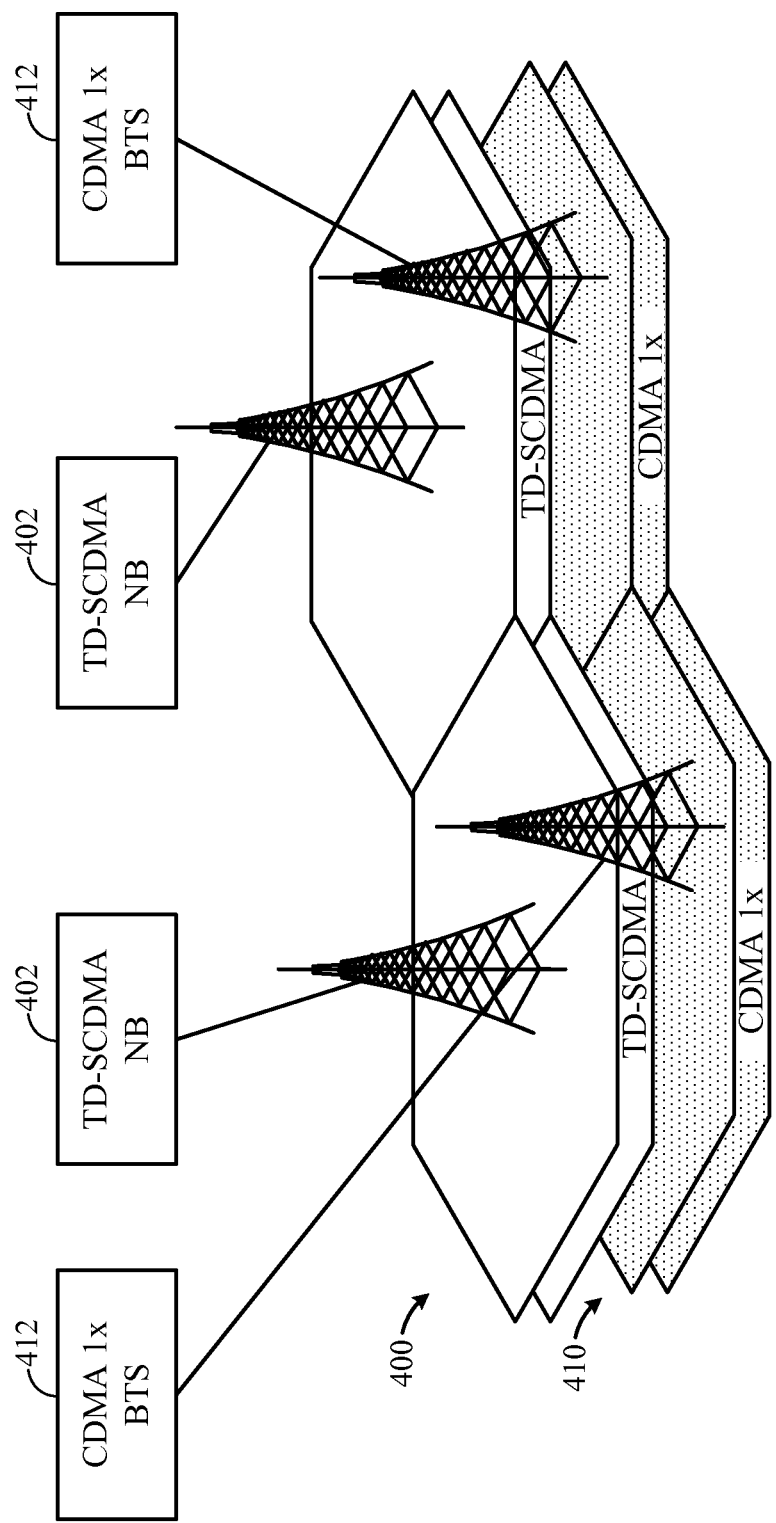
FIG. 4 illustrates an example Time Division Synchronous Code Division Multiple Access (TD-SCDMA) network overlaid on an example Code Division Multiple Access (CDMA) 1xRTT (Radio Transmission Technology) network in accordance with certain aspects of the present disclosure.

In deployment of the TD-SCDMA service, the TD-SCDMA network can become a radio access network overlaid with other technologies, such as CDMA 1xRTT (Radio Transmission Technology), Evolution-Data Optimized (EVDO), or Wideband CDMA (WCDMA). A multimode terminal (supporting, e.g., TD-SCDMA and CDMA 1x) may register with both networks to provide services. FIG. 4 illustrates an example TD-SCDMA network 400 overlaid on an example CDMA 1xRTT network 410. An MMT may communicate with either or both networks 400, 410 via TD-SCDMA node Bs (NBs) 402 and/or CDMA 1x base transceiver stations (BTSs) 412.

When the MMT—called user equipment (UE) in TD-SCDMA or a mobile station (MS) in CDMA—is in an idle state with both RATs, the terminal may periodically tune to the TD-SCDMA or CDMA 1x (or EVDO, WCDMA) base station to listen to the paging message.

The time interval to listen to paging messages (i.e., the paging interval) may be some duration over a periodic cycle:
- TD-SCDMA: One Paging Indicator Channel (PICH) frame and two frames of Paging Channel (PCH), separated by at least $N_{GAP}$ frames within a configurable Paging Block Periodicity over a configurable DRX (Discontinuous Reception) Cycle ($2^3, 2^4, 2^5, 2^6, 2^7, 2^8$, and $2^9$ frames).
- CDMA 1x: 180 ms to cover Quick Paging Channel (QPCH) and Paging Channel (PCH) over a configurable Slotted Paging Cycle=1.28 seconds*$2^{SLOT\_CYCLE\_INDEX}$.
- CDMA EVDO Rev 0: One control channel cycle=426.67 ms over a constant Paging Cycle=5.12 seconds.
- CDMA EVDO Rev A: One control channel cycle=426.67 ms over a configured Paging Cycle=Period3/1.67 ms seconds.
- WCDMA: 22 ms to cover Paging Indicator Channel (PICH) frame and one Paging Channel (PCH) frame over a configurable DRX (Discontinuous Reception) Cycle ($2^3, 2^4, 2^5, 2^6, 2^7, 2^8$, and $2^9$ frames).

Figure 5:
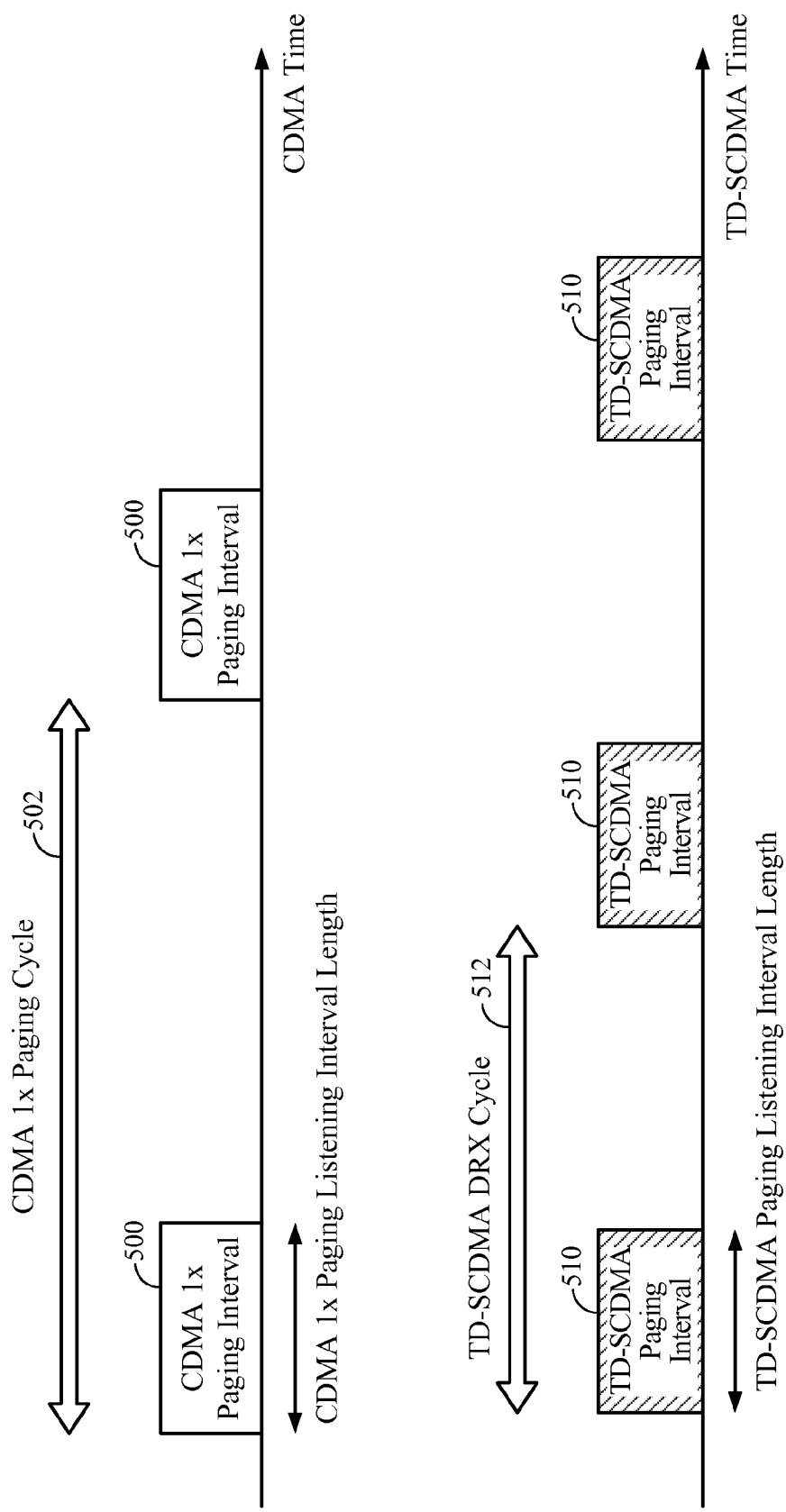
FIG. 5 illustrates an example paging interval conflict between a TD-SCDMA network and a CDMA 1x network in accordance with certain aspects of the present disclosure.

If the UE may only listen to one network at a time, when paging intervals for two networks such as TD-SCDMA and CDMA 1x (or EVDO, WCDMA) overlap, this leads to a paging interval conflict, and the terminal may only choose one network from which to listen to the paging messages. For example, FIG. 5 illustrates a paging interval conflict between a paging interval 500 of a CDMA 1x network and a paging interval 510 of a TD-SCDMA network. The paging interval conflict illustrated occurs during the first CDMA 1x paging cycle 502 and the first TD-SCDMA discontinuous receive (DRX) cycle 512 depicted.

Accordingly, what is needed are techniques and apparatus for resolving such paging interval conflicts and for avoiding missing paging messages of a TD-SCDMA multimode terminal. Certain aspects of the present disclosure provide methods to resolve paging conflicts of TD-SCDMA multimode UEs with MIMO.

A TD-SCDMA multimode terminal may have two antennas and receive radio frequency (RF) chains in MIMO configuration. Especially if the MIMO hardware can independently tune to different frequency bands and channels, aspects of the disclosure propose splitting the MIMO resources in an effort to listen to both TD-SCDMA and CDMA 1x (or EVDO, WCDMA) paging messages, free of paging interval conflicts.

Figure 6:
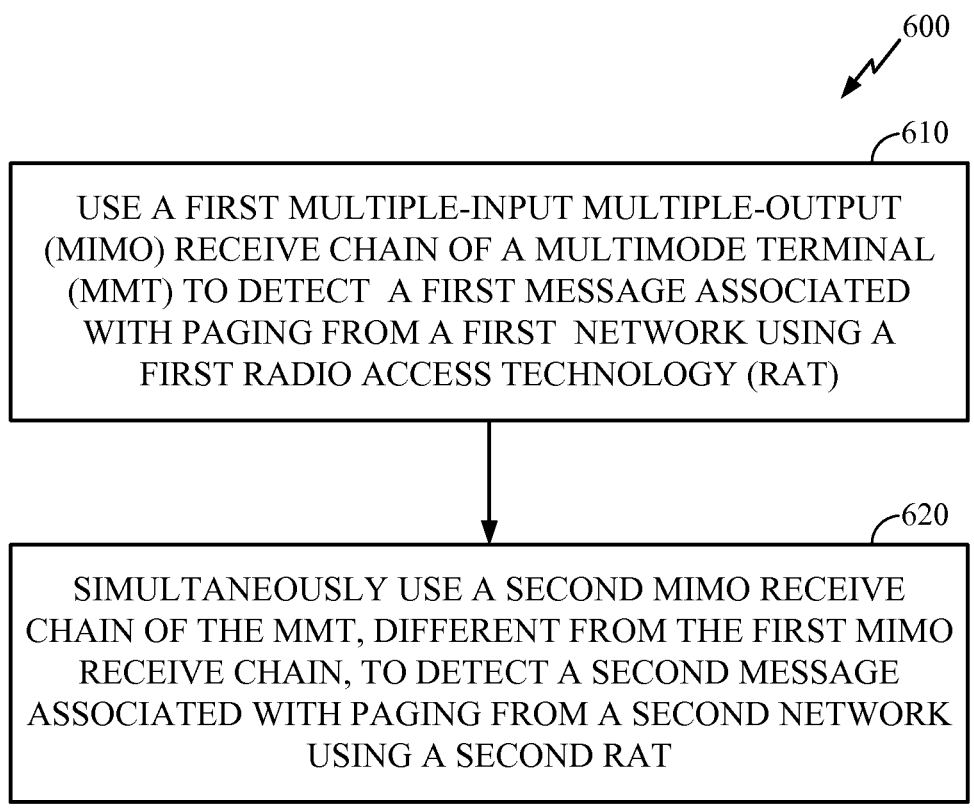
FIG. 6 is a functional block diagram conceptually illustrating example blocks executed to communicate in two networks via two different RATs using two receive circuits in accordance with certain aspects of the present disclosure.

FIG. 6 is a functional block diagram conceptually illustrating example blocks 600 executed to communicate in two networks via two different RATs (e.g., TD-SCDMA and CDMA 1x) using two receive circuits in accordance with certain aspects of the present disclosure. Operations illustrated by the blocks 600 may be executed, for example, at the processor(s) 370 and/or 390 of the UE 350 from FIG. 3. The operations 600 may begin at 610 by using a first MIMO receive chain of an MMT to detect a first message associated with paging from a first network communicating via a first RAT. For some aspects, the message associated with paging may comprise a Paging Indicator Channel (PICH) in addition to a paging message. At 620, a second MIMO receive chain of the MMT, different from the first MIMO receive chain, may be used simultaneously to detect a second message associated with paging from a second network communicating via a second RAT.

In this manner, the MIMO resources may be split in an effort to listen to paging messages from different networks communicating via different RATs. This MIMO resource split may be accomplished in at least two ways.

The first scheme is as follows:
  If the MMT knows that the current paging listening interval for the first RAT may have a paging interval conflict with the second RAT, then the MMT may split the MIMO receive chains by the time the first paging interval having the conflict occurs and only use the first set of hardware to listen to the paging message in the first RAT.
  The second MIMO resource may stand by for the time being and listen for the paging message of the second RAT as soon as the paging interval for the second RAT begins.

Figure 7:
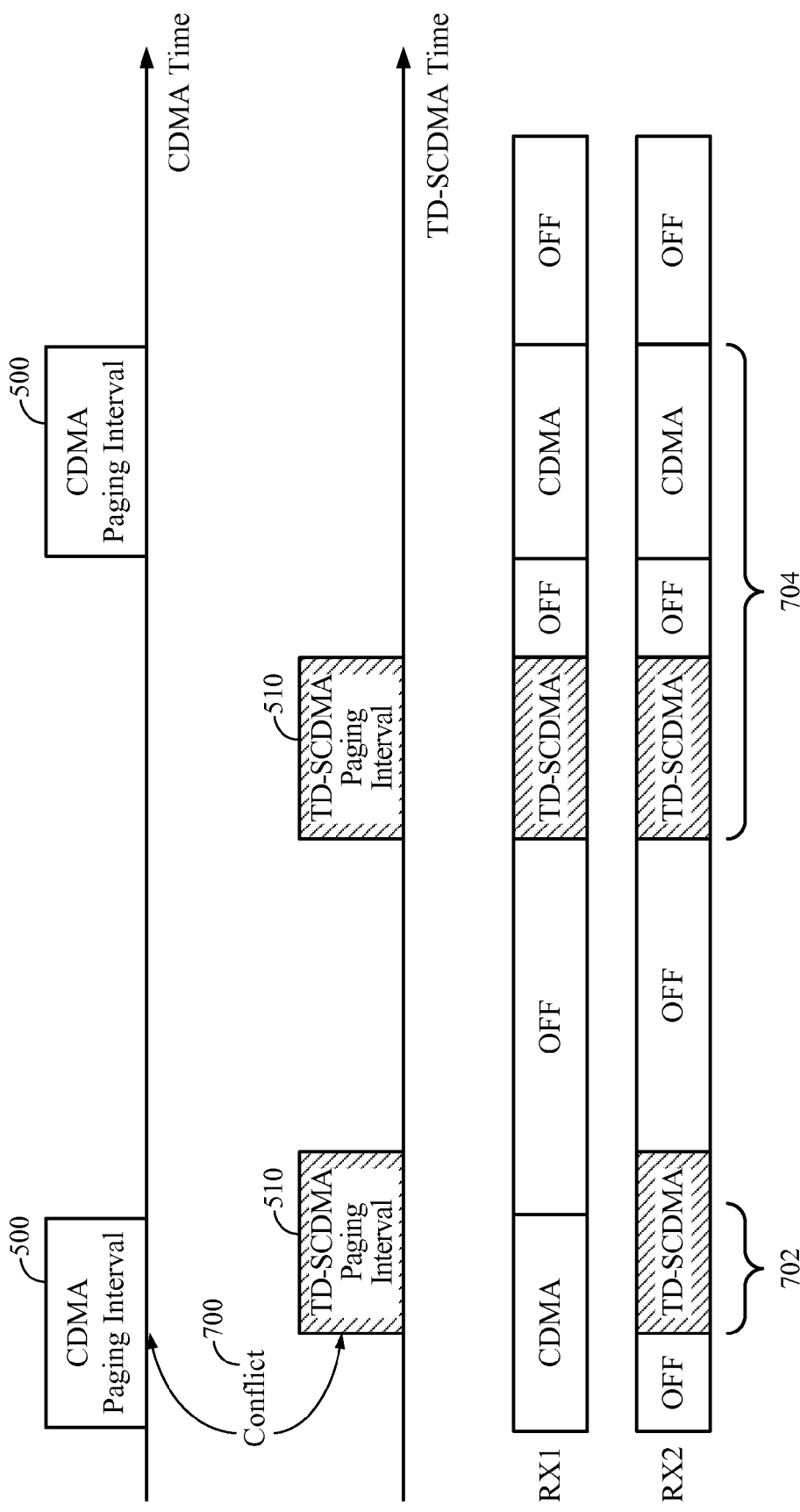
FIG. 7 illustrates splitting the MIMO receive chain during the extent of the paging intervals having a paging interval conflict and using the combined MIMO receive chain to listen for a paging message from either of the two networks at other times during paging cycles, in accordance with certain aspects of the present disclosure.

FIG. 7 illustrates the first scheme and portrays splitting the MIMO receive chain during the extent of the paging intervals 500, 510 having a paging interval conflict 700 and using the combined MIMO receive chain to listen for a paging message from either of the two networks at other times during paging cycles, in accordance with certain aspects of the present disclosure. Since the MMT knows a paging interval conflict 700 will occur, the first receive chain (RX1) may be used to listen for paging messages occurring during the CDMA 1x paging interval as soon as the CDMA 1x paging interval 500 begins. The second receive chain (RX2) may be enter standby mode until the TD-SCDMA paging interval 510 beings, at which time RX2 may be used to listen for paging messages occurring during the TD-SCDMA paging interval. In this manner, RX1 and RX2 may be listening for paging messages occurring during two different networks' paging intervals at 702. Once a paging interval ends, the receive chain used for that paging interval may return to standby as illustrated. If there is no paging interval conflict with another network's paging interval, both receive chains (RX1 and RX2) may be used to listen to paging messages occurring during the paging interval as shown at 704. Restated, the RX chains are split to allow listening to the paging messages in two networks. However, if there is no conflict, then two RX chains are used to listen on network with receive diversity.

The second scheme is more aggressive than the first scheme and involves the following:

- The MMT may continue to use the full MIMO resource for diversity reception of the paging message of the first RAT until the paging interval of the second RAT is about to start.
- When the paging interval of the second RAT starts, the MMT may split the MIMO resources: each receive chain for listening to one RAT.
- Whenever one of two paging intervals ends, the full MIMO resource may be used for the remaining listening paging interval.

Figure 8:
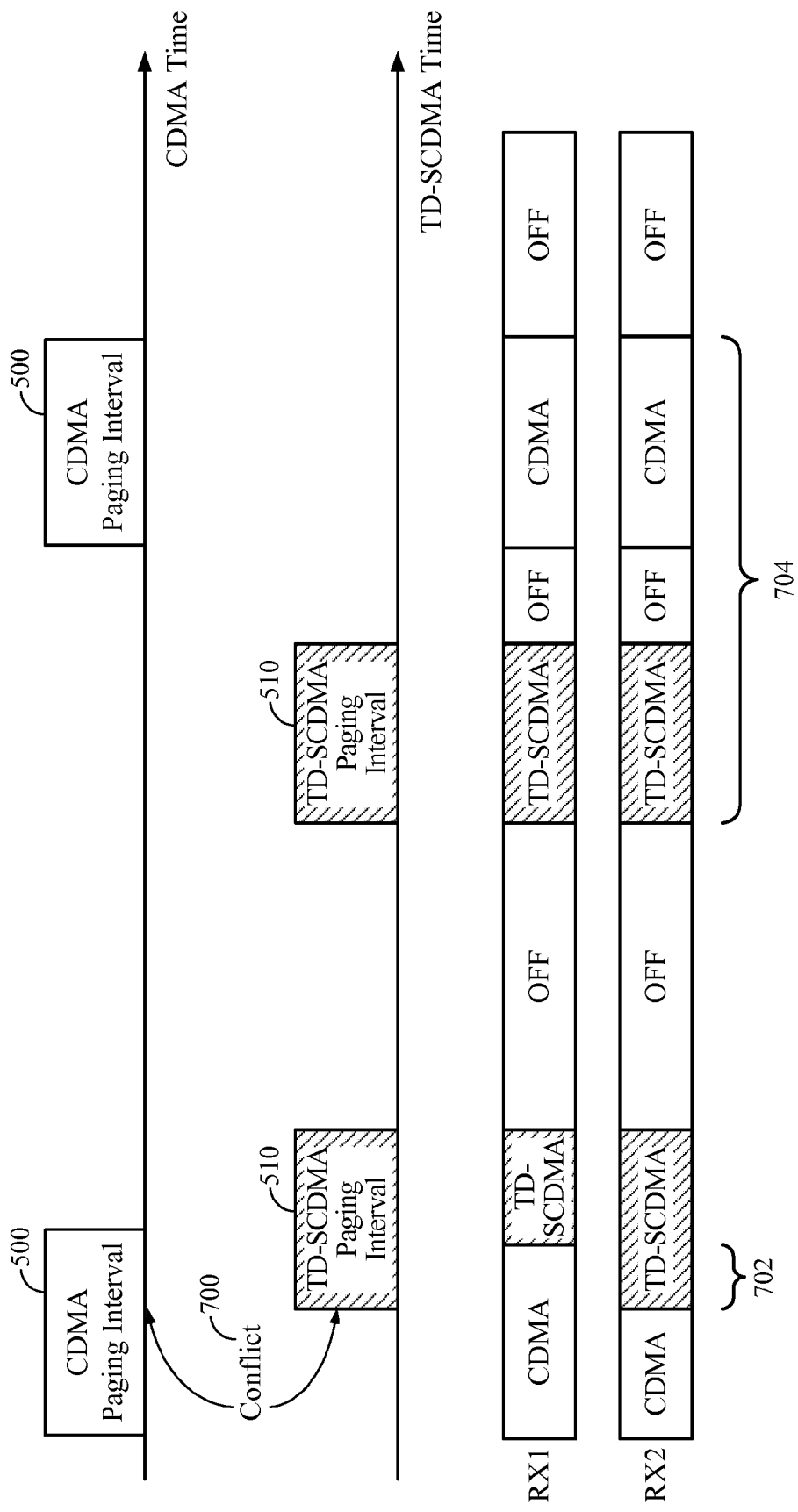
FIG. 8 illustrates splitting the MIMO receive chain only during the paging interval conflict and using the combined MIMO receive chain to listen for a paging message from either of the two networks at other times during paging cycles, in accordance with certain aspects of the present disclosure.

According to the second scheme, the receive chains split only during the actual paging interval conflict. FIG. 8 illustrates splitting the MIMO receive chain only during the paging interval conflict at 702 and using the combined MIMO receive chain to listen for a paging message from either of the two networks at other times during paging cycles, in accordance with certain aspects of the present disclosure. Both RX1 and RX2 may be used to listen for paging messages occurring during the CDMA 1x paging interval as soon as the CDMA 1x paging interval 500 begins. Once the TD-SCDMA paging interval 510 begins, RX2 may be used to listen for paging messages occurring during the TD-SCDMA paging interval. In this manner, RX1 and RX2 may be listening for paging messages occurring during two different networks' paging intervals during the actual paging interval conflict at 702.

When the CDMA 1x paging interval ends, RX1 may be used to listen for paging messages occurring during the TD-SCDMA paging interval, such that both RX1 and RX2 are listening for paging messages from the TD-SCDMA network. Once the TD-SCDMA paging interval 510 ends, both receive chains may return to standby as illustrated. If there is no paging interval conflict with another network's paging interval, both receive chains (RX1 and RX2) may be used to listen to paging messages occurring during the paging interval as shown at 704.

Aspects of the present disclosure may enhance a TD-SCDMA multimode UE to monitor paging channels in a second RAT, such as CDMA 1x, EVDO, or WCDMA. For example, a TD-SCDMA multimode UE may split MIMO resources in an effort to simultaneously monitor the paging messages in TD-SCDMA and CDMA 1x (or EVDO, WCDMA) networks in the two MIMO receive chains.

In one configuration, the apparatus 350 for wireless communication includes means for using a first MIMO receive chain of an MMT to detect a first message associated with paging from a first network using a first RAT and means for simultaneously using a second MIMO receive chain of the MMT, different from the first MIMO receive chain, to detect a second message associated with paging from a second network using a second RAT. In one aspect, the aforementioned means may be the processor(s) 370 and/or 390 configured to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for detecting messages associated with paging, by a multimode terminal (MMT) supporting multiple-input multiple-output (MIMO), from first and second networks using first and second radio access technologies (RATs), comprising:
    using a first MIMO receive chain and a second MIMO receive chain for diversity reception on the first network;
    using the first MIMO receive chain of the MMT to detect a first message associated with paging from the first network; and
    simultaneously using the second MIMO receive chain of the MMT, different from the first MIMO receive chain, to detect a second message associated with paging from the second network in response to detecting an overlap between paging intervals of the first and second networks.

2. The method of claim 1, further comprising:
    using both the first and second MIMO receive chains to detect the first or the second message associated with paging from the first network or the second network, respectively, until one of the paging intervals of the first and second networks containing the overlap begins; and
    using both the first and second MIMO receive chains to detect the first or the second message associated with paging from the first network or the second network, respectively, once the other one of the paging intervals of the first and second networks containing the overlap ends.

3. The method of claim 1, further comprising:
    using both the first and second MIMO receive chains to detect the first or the second message associated with paging from the first network or the second network, respectively, until the overlap between the paging intervals begins; and
    using both the first and second MIMO receive chains to detect the first or the second message associated with paging from the first network or the second network, respectively, once the overlap between the paging intervals ends.

4. The method of claim 1, wherein one of the first and second RATs comprises Time Division Synchronous Code Division Multiple Access (TD-SCDMA).

5. The method of claim 4, wherein the other of the first and second RATs comprises Code Division Multiple Access (CDMA) 1xRTT (Radio Transmission Technology), Evolution-Data Optimized (EVDO), or Wideband CDMA (WCDMA).

6. An apparatus for detecting messages associated with paging from first and second networks using first and second radio access technologies (RATs), comprising:
    at least one processor means for:
        using a first MIMO receive chain and a second MIMO receive chain for diversity reception on the first network;
        using a first multiple-input multiple-output (MIMO) receive chain of the apparatus to detect a first message associated with paging from the first network; and
        simultaneously using a second MIMO receive chain of the apparatus, different from the first MIMO receive chain, to detect a second message associated with paging from the second network in response to detecting an overlap between the paging intervals of the first and second networks; and
    a memory means coupled to the at least one processor means.

7. The apparatus of claim 6, further comprising the at least one processor means:
    using both the first and second MIMO receive chains to detect the first or the second message associated with paging from the first network or the second network, respectively, until one of the paging intervals of the first and second networks containing the overlap begins; and
    using both the first and second MIMO receive chains to detect the first or the second message associated with paging from the first network or the second network, respectively, once the other one of the paging intervals of the first and second networks containing the overlap ends.

8. The apparatus of claim 6, further comprising the at least one processor means:
    using both the first and second MIMO receive chains to detect the first or the second message associated with paging from the first network or the second network, respectively, until the overlap between the paging intervals begins; and
    using both the first and second MIMO receive chains to detect the first or the second message associated with paging from the first network or the second network, respectively, once the overlap between the paging intervals ends.

9. The apparatus of claim 6, wherein one of the first and second RATs comprises Time Division Synchronous Code Division Multiple Access (TD-SCDMA).

10. The apparatus of claim 9, wherein the other of the first and second RATs comprises Code Division Multiple Access (CDMA) 1xRTT (Radio Transmission Technology), Evolution-Data Optimized (EVDO), or Wideband CDMA (WCDMA).

11. An apparatus for detecting messages associated with paging from first and second networks using first and second radio access technologies (RATs), comprising:
    at least one processor configured to:
        use a first MIMO receive chain and a second MIMO receive chain for diversity reception on the first network;
        use a first multiple-input multiple-output (MIMO) receive chain of the apparatus to detect a first message associated with paging from the first network; and
        simultaneously use a second MIMO receive chain of the apparatus, different from the first MIMO receive chain, to detect a second message associated with paging from the second network in response to detecting an overlap between paging intervals of the first and second networks; and
    a memory coupled to the at least one processor.

12. The apparatus of claim 11, wherein the at least one processor is configured to:
    use both the first and second MIMO receive chains to detect the first or the second message associated with paging from the first network or the second network, respectively, until one of the paging intervals of the first and second networks containing the overlap begins; and
    use both the first and second MIMO receive chains to detect the first or the second message paging from the first network or the second network, respectively, once the other one of the paging intervals of the first and second networks containing the overlap ends.

13. The apparatus of claim 11, wherein the at least one processor is configured to:
    use both the first and second MIMO receive chains to detect the first or the second message associated with paging from the first network or the second network, respectively, until the overlap between the paging intervals begins; and
    use both the first and second MIMO receive chains to detect the first or the second message associated with paging from the first network or the second network, respectively, once the overlap between the paging intervals ends.

14. The apparatus of claim 13, wherein one of the first and second RATs comprises Time Division Synchronous Code Division Multiple Access (TD-SCDMA).

15. The apparatus of claim 14, wherein the other of the first and second RATs comprises Code Division Multiple Access (CDMA) 1xRTT (Radio Transmission Technology), Evolution-Data Optimized (EVDO), or Wideband CDMA (WCDMA).

16. A computer-program product for detecting messages associated with paging from first and second networks using first and second radio access technologies (RATs), the computer-program product comprising:
    a non-transitory computer-readable medium comprising code for:
        using a first MIMO receive chain and a second MIMO receive chain for diversity reception on the first network;
        using a first multiple-input multiple-output (MIMO) receive chain of a multimode terminal (MMT) to detect a message associated with paging from the first network; and
        simultaneously using a second MIMO receive chain of the MMT, different from the first MIMO receive chain, to detect a message associated with paging from the second network in response to detecting an overlap between paging intervals of the first and second networks.

17. The computer-program product of claim 16, wherein the computer-readable medium comprises code for:
    using both the first and second MIMO receive chains to detect the message associated with paging from the first network or the second network, respectively, until one of the paging intervals of the first and second networks containing the overlap begins; and
    using both the first and second MIMO receive chains to detect the first or the second message associated with paging from the first network or the second network, respectively, once the other one of the paging intervals of the first and second networks containing the overlap ends.

18. The computer-program product of claim 16, wherein the computer-readable medium comprises code for:
    using both the first and second MIMO receive chains to detect the first or the second message associated with paging from the first network or the second network, respectively, until the overlap between the paging intervals begins; and
    using both the first and second MIMO receive chains to detect the first or the second message associated with paging from the first network or the second network, respectively, once the overlap between the paging intervals ends.

19. The computer-program product of claim 16, wherein one of the first and second RATs comprises Time Division Synchronous Code Division Multiple Access (TD-SCDMA).

20. The computer-program product of claim 19, wherein the other of the first and second RATs comprises Code Division Multiple Access (CDMA) 1xRTT (Radio Transmission Technology), Evolution-Data Optimized (EVDO), or Wideband CDMA (WCDMA).

* * * * *